United States Patent
Okamoto et al.

(10) Patent No.: US 12,100,430 B2
(45) Date of Patent: Sep. 24, 2024

(54) DATA PROCESSOR, MAGNETIC RECORDING/REPRODUCING DEVICE, AND MAGNETIC RECORDING/REPRODUCING SYSTEM

(71) Applicant: KABUSHIKI KAISHA TOSHIBA, Tokyo (JP)

(72) Inventors: Kazuaki Okamoto, Yokohama Kanagawa (JP); Yousuke Isowaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/364,747

(22) Filed: Aug. 3, 2023

(65) Prior Publication Data

US 2024/0170011 A1  May 23, 2024

(30) Foreign Application Priority Data

Nov. 17, 2022 (JP) .................................. 2022-183829

(51) Int. Cl.
 *G11B 5/09* (2006.01)
 *G11B 5/48* (2006.01)
 *G11B 5/596* (2006.01)

(52) U.S. Cl.
 CPC .............. *G11B 5/09* (2013.01); *G11B 5/4886* (2013.01); *G11B 5/59627* (2013.01)

(58) Field of Classification Search
 None
 See application file for complete search history.

(56) References Cited

U.S. PATENT DOCUMENTS

| | | | |
|---|---|---|---|
| 5,854,722 A * | 12/1998 | Cunningham | G11B 21/106 |
| 6,421,198 B1 * | 7/2002 | Lamberts | G11B 5/59627 360/77.04 |
| 7,133,244 B1 * | 11/2006 | Chang | G11B 5/59627 360/75 |
| 10,366,718 B1 | 7/2019 | Supino | |
| 10,607,645 B1 * | 3/2020 | Hamaguchi | G11B 5/5552 |
| 2003/0002200 A1 * | 1/2003 | Shishida | G11B 5/59627 360/60 |
| 2003/0184909 A1 * | 10/2003 | Zhang | G11B 5/59627 360/77.04 |
| 2004/0246619 A1 * | 12/2004 | Zhang | G11B 21/106 360/75 |
| 2020/0411050 A1 * | 12/2020 | Ide | G11B 20/10305 |

* cited by examiner

*Primary Examiner* — Peter Vincent Agustin
(74) *Attorney, Agent, or Firm* — Finnegan, Henderson, Farabow, Garrett & Dunner, LLP

(57) ABSTRACT

According to one embodiment, a data processor includes an interface section and a processor. The interface section is configured to acquire partial data relating to a control condition of a magnetic recording/reproducing device. The processor is configured to process the partial data. The processor is configured to derive a first data by processing the partial data with a first model based on characteristics of the partial data, a first resolution of the first data being higher than a partial resolution of the partial data. The processor is configured to derive a second data by processing the partial data with a second model based on the characteristic. The second model is different from the first model. A second resolution of the second data being higher than the partial resolution.

19 Claims, 4 Drawing Sheets

DATA PROCESSOR, MAGNETIC RECORDING/REPRODUCING DEVICE, AND MAGNETIC RECORDING/REPRODUCING SYSTEM

CROSS-REFERENCE TO RELATED APPLICATIONS

This application is based upon and claims the benefit of priority from Japanese Patent Application No. 2022-183829, filed on Nov. 17, 2022; the entire contents of which are incorporated herein by reference.

FIELD

Embodiments described herein relate generally to a data processor, a magnetic recording/reproducing device, and a magnetic recording/reproducing system.

BACKGROUND

For example, appropriate control conditions for the operation of the magnetic recording/reproducing device enable stable recording and reproduction.

DETAILED DESCRIPTION

Figure 1:
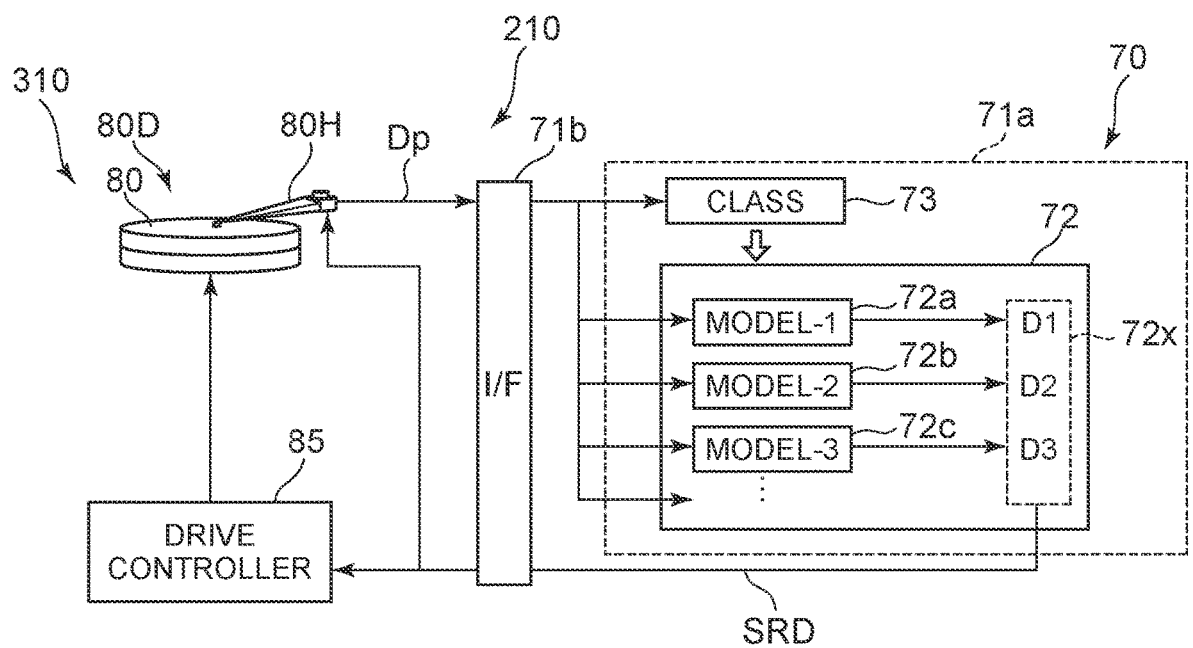
FIG. 1 is a schematic diagram illustrating a data processor and a magnetic recording/reproducing device according to a first embodiment.

According to one embodiment, a data processor includes an interface section and a processor. The interface section is configured to acquire partial data relating to a control condition of a magnetic recording/reproducing device. The processor is configured to process the partial data. The processor is configured to derive a first data by processing the partial data with a first model based on characteristics of the partial data, a first resolution of the first data being higher than a partial resolution of the partial data. The processor is configured to derive a second data by processing the partial data with a second model based on the characteristic. The second model is different from the first model. A second resolution of the second data being higher than the partial resolution.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic diagram illustrating a data processor and a magnetic recording/reproducing device according to a first embodiment.

As shown in FIG. 1, a data processor 70 according to the embodiment is used together with the magnetic recording/reproducing device 210. As will be described later, the data processor 70 may be included in the magnetic recording/reproducing device 210. An example in which the data processor 70 is provided separately from the magnetic recording/reproducing device 210 will be described below.

The magnetic recording/reproducing device 210 includes a magnetic recording medium 80. The magnetic recording/reproducing device 210 may include a recording section 80D. The magnetic recording medium 80 is included in the recording section 80D.

The magnetic recording medium 80 may include, for example, a magnetic disk (HDD: Hard Disk Drive). The recording section 80D may include, for example, an SSD (Solid State Drive). The recording section 80D includes, for example, a magnetic head 80H. Information is recorded on the magnetic recording medium 80 by the magnetic head 80H. Information recorded on the magnetic recording medium 80 is reproduced by the magnetic head 80H.

The magnetic recording/reproducing device 210 may include an operation controller 85. The operation controller 85 is configured to control at least one of the magnetic recording medium 80 and the magnetic head 80H. Under the control of the operation controller 85, information is recorded at a target position on the magnetic recording medium 80 by the magnetic head 80H. Information recorded at the target position on the magnetic recording medium 80 is reproduced by the magnetic head 80H under the control of the operation controller 85.

As shown in FIG. 1, the data processor 70 includes an interface section 71b and a processor 71a.

The interface section 71b is configured to acquire a partial data Dp regarding control conditions of the magnetic recording/reproducing device 210. For example, the partial data Dp is low-density data (LR-data) regarding the control conditions. The partial data Dp may be recorded on the magnetic recording medium 80, for example. The partial data Dp may be information reproduced by the magnetic head 80H, for example.

In one example, the partial data Dp relates to RRO (Repeatable Run_Out) of the magnetic recording/reproducing device 210.

The processor 71a is configured to process the partial data Dp acquired by the interface section 71b.

The processor 71a may include, for example, a classification model 73 and a plurality of models 72. The Classification model 73 is, for example, a classifier. The plurality of models 72 are, for example, a plurality of estimators.

For example, the classifier (classification model 73) of the processor 71a classifies the partial data Dp into one of a plurality of classifications based on the characteristics of the partial data Dp.

The processor 71a processes the partial data Dp by one of the plurality of models 72 corresponding to the classification result classified by the classification model 73 to derive estimated data 72x. The resolution of the estimated data 72x is higher than the resolution of the partial data Dp.

For example, the operation controller 85 controls the magnetic recording/reproducing device 210 using the estimated data 72x having the high resolution. As a result, the magnetic recording/reproducing device 210 can be controlled with high accuracy.

The plurality of models 72 include, for example, a first model 72a and a second model 72b. The plurality of models 72 may further include a third model 72c and so on.

For example, the processor 71a is configured to process the partial data Dp by the first model 72a based on the characteristics of the partial data Dp to derive the first data D1. The resolution (first resolution) of the first data D1 is higher than the resolution (partial resolution) of the partial data Dp. The partial data Dp is low-resolution data (LR-data).

For example, the processor 71a is configured to process the partial data Dp by the second model 72b based on the characteristics of the partial data Dp to derive the second data D2. The second model 72b is different from the first model 72a. The resolution (second resolution) of the second data D2 is higher than the partial resolution.

According to the embodiment, the processor 71a classifies the partial data Dp into one of the plurality of classifications based on the characteristics of the partial data Dp of low resolution. The processor 71a processes one of the plurality of models 72 (for example, the first model 72a or the second model 72b) according to the classification result to derive the estimated data 72x (for example, the first data D1 or the second data D2). The magnetic recording/reproducing device 210 is controlled by using the estimated data 72x having high-resolution.

In the embodiment, recording with high recording density becomes possible. Reproduction with high recording density becomes possible. According to the embodiments, it is possible to provide a data processor capable of deriving appropriate control conditions. According to the embodiments, it is possible to provide a high-density magnetic recording/reproducing device with appropriate control conditions.

For example, the partial data Dp, the first data D1, and the second data D2 relate to the RRO of the magnetic recording/reproducing device 210.

For example, the partial data Dp includes (i+k·n)th data. "i" is an integer of 1 or greater. "k" is an integer greater than or equal to 1. "n" is an integer of 0 or greater. At least one of the first data D1 or the second data D2 includes, for example, (i+n)th data.

For example, in a first reference example, all high resolution data (HR-data) regarding RRO is acquired. The RRO data at substantially all recording positions on the magnetic recording medium 80 are obtained for the high resolution data. In the first reference example, the magnetic recording/reproducing device 210 is controlled based on the obtained high-resolution data. In the first reference example, highly accurate control is possible. However, long-time measurements are required to acquire high-resolution data. It is difficult to determine the control conditions with high efficiency.

On the other hand, in a second reference example, the RRO data (partial data Dp) relating to a part of all recording positions on the magnetic recording medium 80 is acquired. In the second reference example, the time for acquisition of the RRO data is short. However, in the second reference example, since only the partial data Dp is used, the accuracy of control is low. For this reason, the improvement in high density in recording and reproduction is insufficient.

Furthermore, in a third reference example, the partial data Dp is acquired, and the partial data Dp being acquired is processed by one model to derive the estimated data 72x having high-resolution. In the third reference example, since estimated data 72x having high-resolution is used, it is considered that highly accurate control is possible compared to the second reference example. However, the characteristics of the magnetic recording/reproducing device 210 fluctuate due to various factors. Therefore, when the partial data Dp being obtained is processed by one model, it is difficult to sufficiently reduce the difference between the estimated data 72x obtained by the processing and the true high-resolution data.

In contrast, in the embodiment, a model to be adopted is selected from the plurality of models 72 based on the characteristics of the partial data Dp being acquired. For example, the partial data Dp being acquired is classified based on the characteristics of the partial data Dp being acquired. Processing by one of the plurality of models 72 according to the classification result is performed to derive the estimated data 72x. Thereby, in the embodiment, the estimated data 72x with higher accuracy than the third reference example can be obtained. In the embodiment, the difference between the estimated data 72x and the true high-resolution data can be decreased comparing with the third reference example.

In the embodiment, the plurality of models 72 may be set according to the number of classifications. For example, the number of the plurality of classifications may be 3. For example, the processor 71a may process the partial data Dp by the third model 72c based on the characteristics of the partial data Dp to derive a third data D3. The third model 72c is different from the first model 72a and different from the second model 72b. The resolution (third resolution) of the third data D3 is higher than the partial resolution. The third resolution includes, for example, (i+n)th data.

One of the plurality of models 72 may be machine-learned based on one of the plurality of learning data regarding the control conditions.

For example, machine learning is performed based on first learning data regarding the control conditions to generate the first model 72a. The second model 72b is generated by machine learning based on second learning data regarding the control conditions. At least a part of the second learning data is different from at least a part of the first learning data. The third model 72c is generated by machine learning based on third learning data regarding the control conditions. At least a part of the third learning data differs from at least a part of the first learning data and differs from at least a part of the second learning data.

A model generated by machine learning based on the learning data corresponding to the characteristics of the partial data Dp is used. This provides more accurate estimated data 72x.

As shown in FIG. 1, the estimated data 72x may include, for example, at least one of the first data D1 being derived or second data D2 being derived. The estimated data 72x is, for example, super-resolution data SRD (SR-data). At least one of the first data D1 or the second data D2 (super-resolution data SRD) may be output to the outside via the interface section 71b.

For example, at least one of the first data D1 or the second data D2 (super-resolution data SRD) may be supplied to the operation controller 85. The operation controller 85 may be able to control the recording section 80D (at least one of the magnetic recording medium 80 or the magnetic head 80H) based on at least one of the first data D1 or the second data D2 (for example, RRO data).

For example, at least one of the first data D1 or the second data D2 may be supplied to the magnetic head 80H. The magnetic head 80H may record at least one of the first data D1 or the second data D2 on the magnetic recording medium 80.

Figure 2:
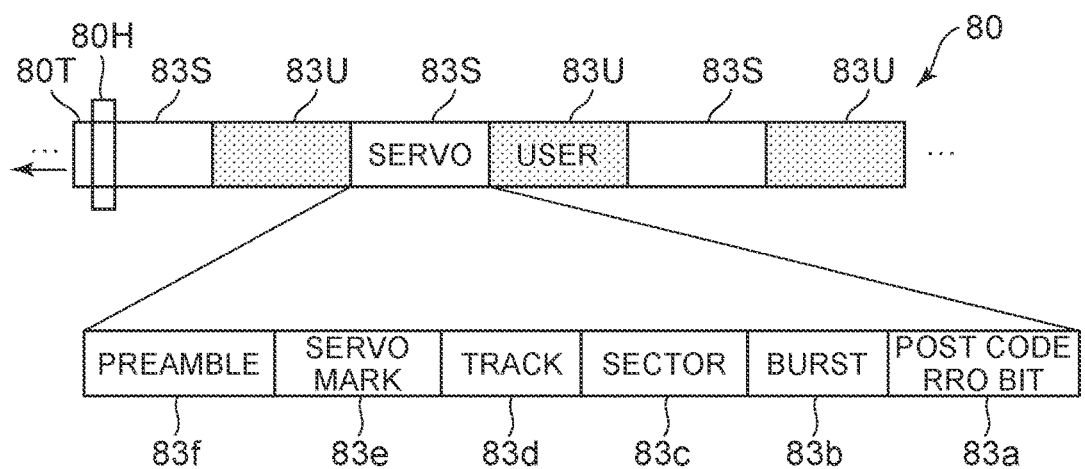
FIG. 2 is a schematic diagram illustrating part of the magnetic recording/reproducing device according to the first embodiment.

FIG. 2 is a schematic diagram illustrating part of the magnetic recording/reproducing device according to the first embodiment.

FIG. 2 illustrates the magnetic recording medium 80. As shown in FIG. 2, data (information) is recorded on the magnetic recording medium 80 by the magnetic head 80H. The area being recorded corresponds to the data track 80T.

The data track 80T includes a plurality of servo data areas 83S and a plurality of user data areas 83U. For example, the servo data areas 83S and the user data areas 83U may be arranged alternately.

For example, a post code 83a is recorded in one of the plurality of servo data areas 83S. The post code 83a corresponds to, for example, an RRO bit (RRO data).

For example, a burst signal 83b is recorded in one of the plurality of servo data areas 83S. For example, the control is performed so that the magnetic head 80H passes through the center of the burst signal 83b. For example, the magnetic head 80H is designed to move in a perfect circular orbit around the center of rotation of the magnetic recording medium 80.

Practically, the movement of the magnetic head 80H deviates from the perfect circle, and the RRO occurs. Data regarding the RRO is recorded in the post code 83a. High-precision control is possible by reproducing the RRO data recorded in the post code 83a and controlling the position based on the burst signal 83b and the RRO data. For example, the RRO data supports the control using the burst signal 83b.

In the embodiment, for example, the estimated data 72x being derived (first data D1 or second data D2) may be recorded in post code 83a. The estimated data 72x recorded in the post code 83a may be reproduced by the magnetic head 80H to control its position.

As shown in FIG. 2, in one of the plurality of servo data areas 83S, for example, a preamble 83f, a servo mark 83e, a track data 83d and a sector data 83c may be recorded.

The location where at least one of the interface section 71b and the processor 71a is provided may be different from the location where the magnetic recording/reproducing device 210 is provided. The location where at least one of the interface section 71b and the processor 71a is provided may be substantially the same as the location where the magnetic recording/reproducing device 210 is provided.

Communication (data transmission/reception) between at least one of the interface section 71b and the processor 71a and the magnetic recording/reproducing device 210 may be performed by any wired or wireless method.

As described below, in the second embodiment, at least one of the interface section 71b and the processor 71a may be included in the magnetic recording/reproducing device 210.

Second Embodiment

Figure 3:
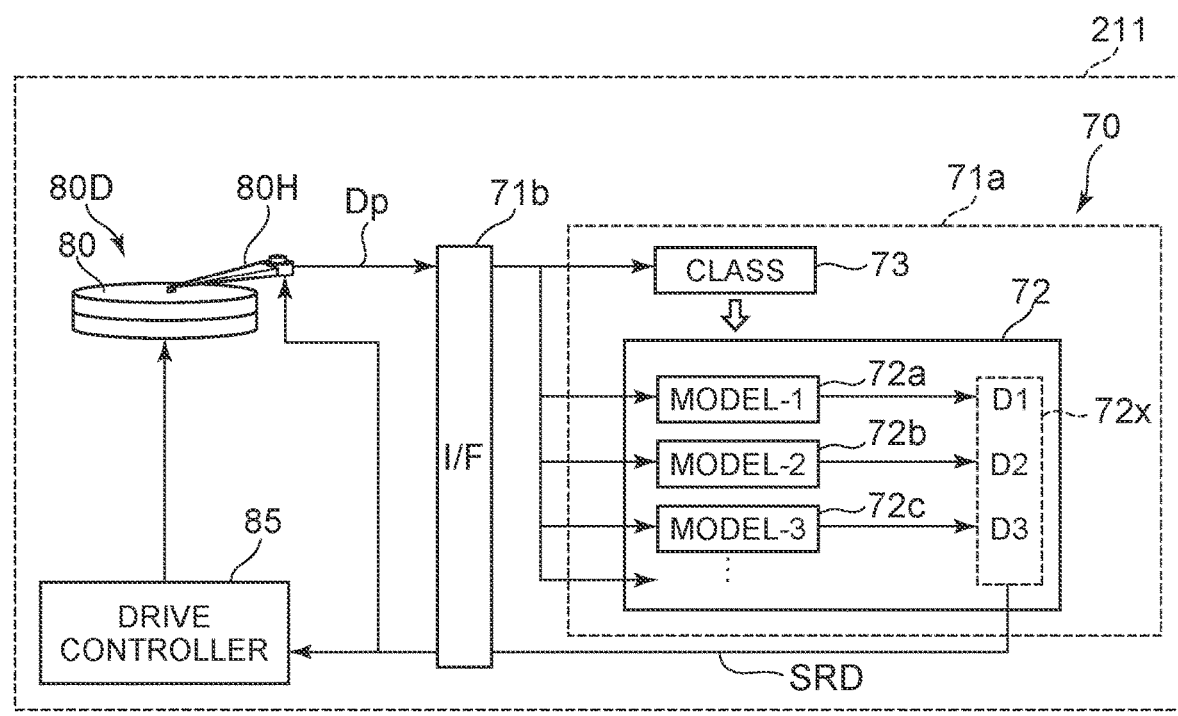
FIG. 3 is a schematic diagram illustrating a magnetic recording/reproducing device according to a second embodiment.

FIG. 3 is a schematic diagram illustrating a magnetic recording/reproducing device according to a second embodiment.

As shown in FIG. 3, a magnetic recording/reproducing device 211 according to the embodiment includes the data processor 70 (see FIG. 1). The data processor 70 includes the interface section 71b and the processor 71a. The interface section 71b is configured to acquire the partial data Dp regarding the control conditions of the magnetic recording/reproducing device 211. The processor 71a is configured to process the partial data Dp.

As described above, the processor 71a is configured to process the partial data Dp by the first model 72a based on the characteristics of the partial data Dp to derive the first data D1. The first resolution of the first data D1 is higher than the partial resolution of the partial data Dp. The processor 71a is configured to derive the second data D2 by processing the partial data Dp by the second model 72b based on the characteristics. The second model 72b is different from the first model 72a. The second resolution of the second data D2 is higher than the partial resolution.

The partial data Dp may be recorded on the magnetic recording medium 80 included in the magnetic recording/reproducing device 211.

The magnetic recording/reproducing device 211 may include the magnetic head 80H. The interface section 71b may be configured to acquire the partial data Dp recorded on the magnetic recording medium 80 (for example, the post code 83a) and reproduced by the magnetic head 80H.

The magnetic head 80H may record at least one of the first data D1 or the second data D2 on the magnetic recording medium 80. For example, the magnetic head 80H is configured to record at least one of the first data D1 or the second data D2 in the post code area (post code 83a) of the magnetic recording medium 80.

For example, the partial data Dp, the first data D1, and the second data D2 relate to the RRO of the magnetic recording/reproducing device 211.

The magnetic recording/reproducing device 211 may further include the operation controller 85. The operation controller 85 is configured to control at least one of the magnetic recording medium 80 or the magnetic head 80H based on at least one of the first data D1 or the second data D2.

In the magnetic recording/reproducing device 211, the processor 71a may be configured to derive the third data D3 by processing the partial data Dp with the third model 72c based on the characteristics of the partial data Dp. The third model 72c is different from the first model 72a and different from the second model 72b. The third resolution of the third data D3 is higher than the partial resolution.

Third Embodiment

The third embodiment relates to a magnetic recording/reproducing system. As shown in FIG. 1, a magnetic recording/reproducing system 310 according to the embodiment includes the data processor 70 according to the embodiment and the magnetic recording/reproducing device 210. According to the embodiments, a data processor capable of deriving appropriate control conditions can provide a high-density magnetic recording/reproducing system with appropriate control conditions.

In the embodiments, the partial data Dp is classified into a plurality of classifications. In this case, classification may be performed by comparing with a predetermined threshold value. For example, when the number of the plurality of classifications is three, the first threshold and the second threshold are used. For example, when the partial data Dp or the data derived from the partial data Dp is less than the first threshold value, the partial data Dp is classified into a first classification. For example, when the partial data Dp or the data derived from the partial data Dp is equal to or greater than the first threshold value and less than the second threshold value, the partial data Dp is classified into a second classification. For example, when the partial data Dp or the data derived from the partial data Dp is equal to or greater than the second threshold value, the partial data Dp is classified into a third classification.

Figure 4:
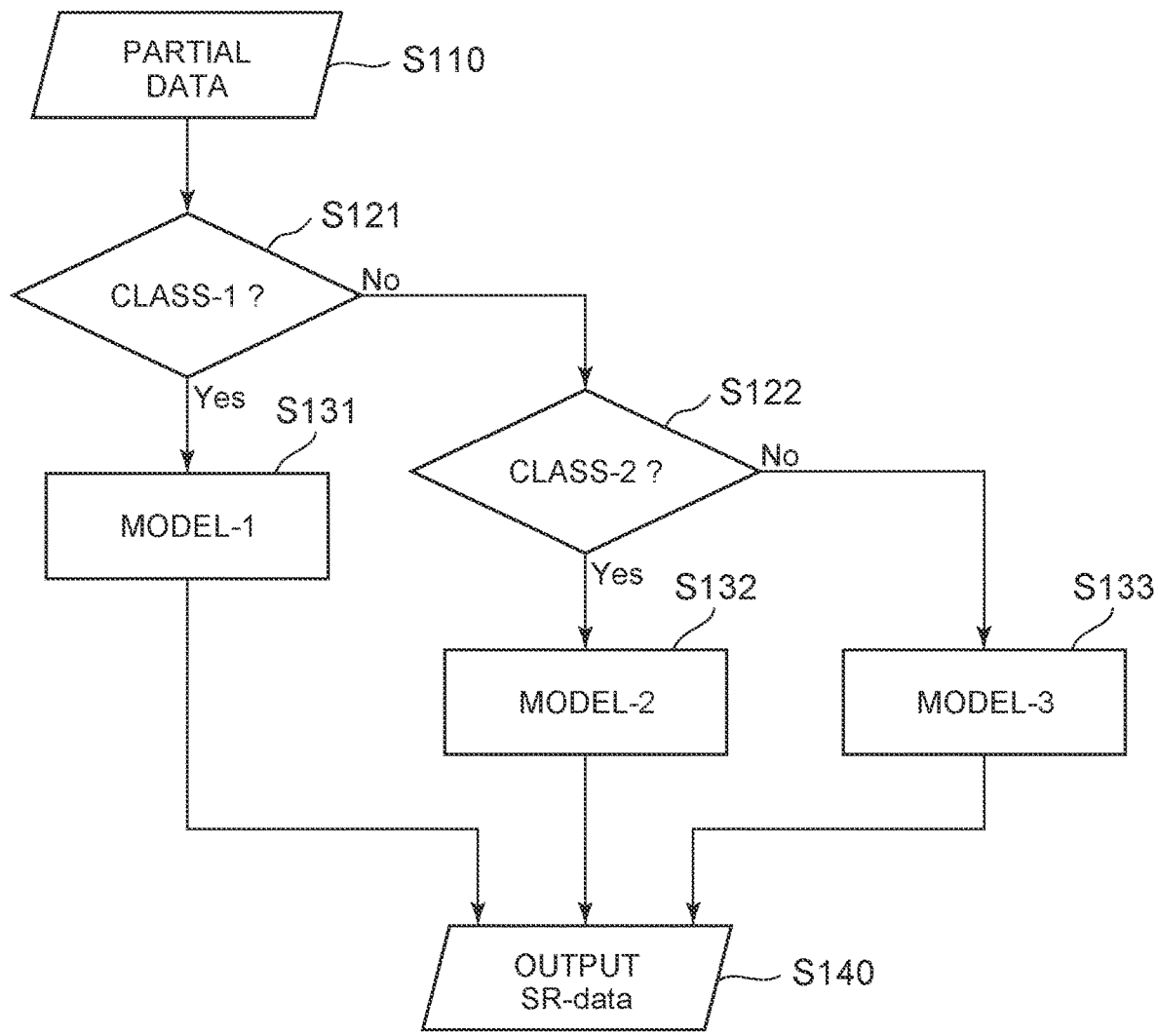
FIG. 4 is a flowchart illustrating the operation of the data processor according to the embodiment.

FIG. 4 is a flowchart illustrating the operation of the data processor according to the embodiment.

FIG. 4 illustrates the operation of the processor 71a. In this example, the number of multiple classifications is three. In the embodiments, the number of categories may be any integer greater than or equal to two. In the following, "partial data Dp" may be "partial data Dp or data derived from partial data Dp".

As shown in FIG. 4, the partial data Dp is acquired (step S110). It is determined whether the partial data Dp is of the first classification (step S121). If the partial data Dp is of the first classification, the partial data Dp is processed by the first model 72a (step S131) to derive the first data D1.

In step S121, if the partial data Dp is not of the first classification, it is determined whether the partial data Dp is of the second classification (step S122). If the partial data Dp is of the second classification, the partial data Dp is processed by the second model 72b (step S132) to derive the second data D2.

In step S122, if the partial data Dp is not of the second classification, the partial data Dp is processed by the third model 72c (step S133) to derive the third data D3.

For example, one of the first data D1, the second data D2 or the third data D3 is output as the super-resolution data SRD (step S140).

In the example of FIG. 4, the partial data Dp are classified in a plurality of steps. In the embodiments, the classification of the partial data Dp may be performed in one step.

Figure 5:
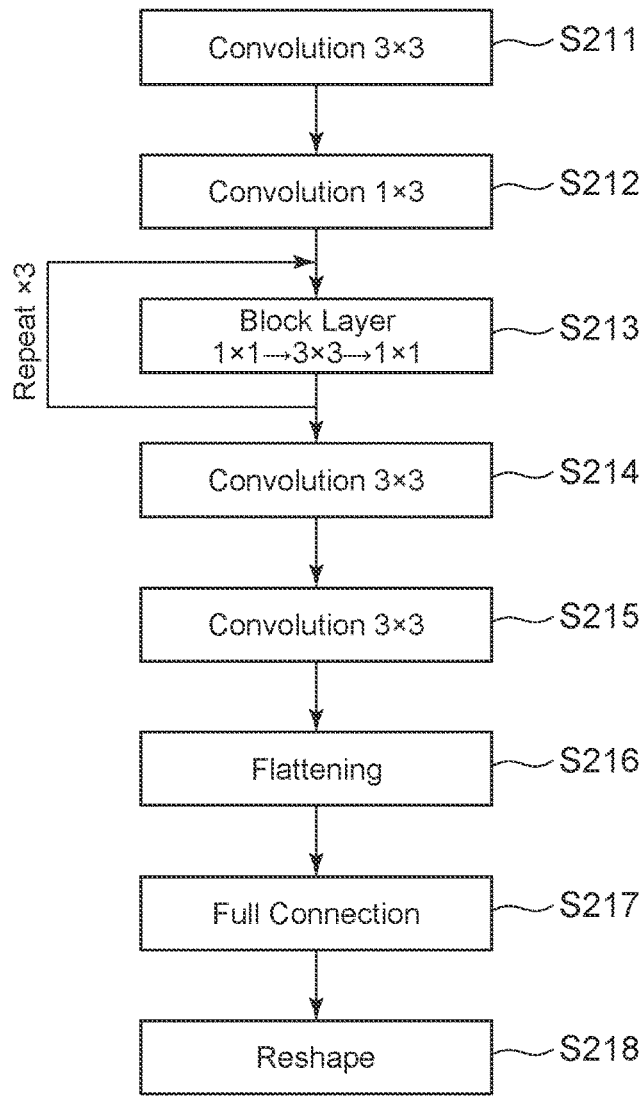
FIG. 5 is a flowchart illustrating the operation of the data processor according to the embodiment.

FIG. 5 is a flowchart illustrating the operation of the data processor according to the embodiment.

FIG. 5 illustrates the operation in one of the plurality of models 72. The processing of FIG. 5 is performed, for example, by the processor 71a. The processing of FIG. 5 is performed, for example, on the plurality of partial data Dp. The input data is low resolution data (LR-data). In the example of FIG. 5, the partial data Dp has a two-dimensional data structure (for example, a structure corresponding to image data).

As shown in FIG. 5, for example, convolution is performed on the partial data Dp (step S211). In this example, a 3×3 kernel size convolution is performed. Another convolution is then performed (step S212). In this example, a 1×3 kernel size convolution is performed.

As shown in FIG. 5, in a block layer, 1×1 kernel size processing, 3×3 kernel size processing, and 1×1 kernel size processing are performed (step S213). Step S213 is repeatedly performed. The number of repetitions is three, for example. The block layer may be, for example, a model used in a Residual Network.

As shown in FIG. 5, a 3×3 kernel size convolution is performed (step S214). Further, 3×3 convolution is performed (step S215). After that, data shaping into a one-dimensional structure (flattening) is performed (step S216). Further, a process of full connection is performed (step S217). Reshape is performed to return the data structure to two dimensions (step S218). As a result, the estimated data 72x is obtained. The estimated data 72x being obtained is output. The resolution of the estimated data 72x is higher than the resolution of the partial data Dp. The estimated data 72x is, for example, super-resolution data SRD (SR-data).

In the embodiments, various operations may be performed in one of the plurality of models 72. In the embodiments, the partial data Dp and the estimated data 72x may include data related to planar unevenness or defects of the magnetic recording medium 80 in addition to RRO. The partial data Dp and the estimated data 72x may include arbitrary data regarding control conditions of the magnetic recording/reproducing device.

The embodiments may include a method for manufacturing the magnetic recording/reproducing device. The method of manufacturing the magnetic recording/reproducing device may include recording at least one of the first data D1 and the second data D2 derived by the data processor 70 according to the embodiment on a magnetic recording medium. The method for manufacturing the magnetic recording/reproducing device may be applied to the inspection process of the magnetic recording/reproducing device.

According to the embodiments, the estimated data 72x can be derived with higher accuracy than the third reference example.

For example, when the partial data Dp relates the RRO, the RRO in the second classification is larger than the RRO in the first classification, and the RRO in the third classification is larger than the RRO in the second classification, the simulation results are as follows.

In the embodiment, the difference (3σ) between the first data D1 relating to the RRO in the first classification and the RRO of the high-resolution data is, for example, 0.55 nm. On the other hand, in the third reference example in which one kind of model is used, the difference (3σ) between the RRO of the estimated data 72x and the RRO of the high-resolution data is, for example, 0.58 nm. In this example, "3σ" is a value 3 times the standard deviation (σ) of the distribution of the difference (prediction error) between the high-resolution data and the estimated data 72x. The smaller the difference (3σ), the higher the estimation accuracy for the high-resolution data.

In the embodiment, the difference (3σ) between the second data D2 relating to the RRO in the second classification and the RRO of the high-resolution data is, for example, 0.72 nm. On the other hand, in the third reference example in which one kind of model is used, the difference (3σ) between the RRO of the estimated data 72x and the RRO of the high-resolution data is, for example, 0.73 nm.

In the embodiment, the difference (3σ) between the third data D3 relating to the RRO in the third classification and the RRO of the high-resolution data is, for example, 0.92 nm. On the other hand, in the third reference example in which one kind of model is used, the difference (3 σ) between the RRO of the estimated data 72x and the RRO of the high-resolution data is, for example, 0.93 nm.

As described above, in the embodiments, by using a model corresponding to the classification of the partial data Dp, estimated data 72 x of higher accuracy can be obtained.

Figure 6:
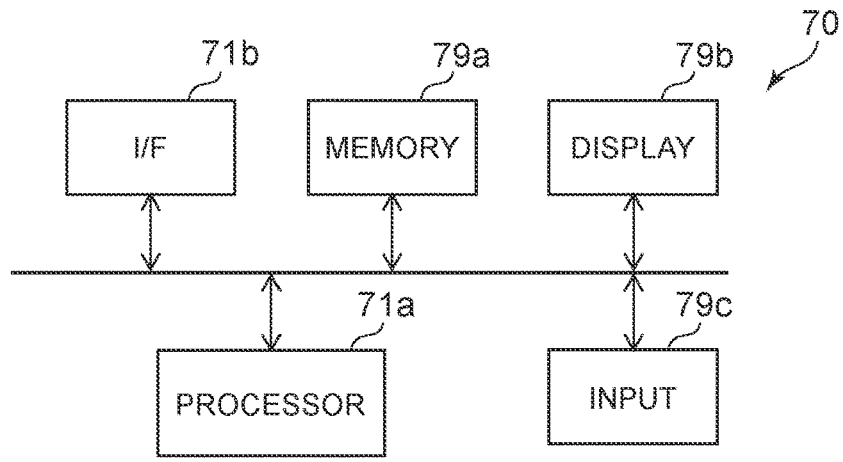
FIG. 6 is a schematic diagram illustrating the data processing device according to the embodiment.

FIG. 6 is a schematic diagram illustrating the data processing device according to the embodiment.

As shown in FIG. 6, the data processor 70 includes the processor 71a and the interface section 71b. The processor 71a is, for example, an electric circuit. The data processor 70 may include a memory 79a (storage). The memory 79a may include, for example, at least one of ROM (Read Only Memory) or RAM (Random Access Memory). For example, a part of the recording section 80D may be used as the memory 79a.

The data processor 70 may include a display 79*b* and an input section 79*c*. The display 79*b* may include various displays. The input section 79*c* includes, for example, a device having an operation function (e.g., keyboard, mouse, touch input panel, voice recognition input device, etc.).

In a plurality elements included in the data processor 70, communicate with each other can be performed by wireless and/or wired methods. The locations where the elements included in the data processor 70 are provided may differ from each other. For example, a general-purpose computer may be used as the data processor 70. As the data processor 70, for example, a plurality of computers connected to each other may be used. A dedicated circuit may be used as at least a part of the data processor 70 (for example, the processor 71*a*, etc.). As the data processor 70, for example, a plurality of circuits connected to each other may be used.

The embodiments may include a program. The program causes the computer (data processor 70) to perform the above operations. The embodiments may include a storage medium storing the above program.

The embodiments may include the following configurations (for example, technical proposals).

Configuration 1
  A data processor, comprising:
    an interface section configured to acquire partial data relating to a control condition of a magnetic recording/reproducing device; and
    a processor configured to process the partial data,
    the processor being configured to derive a first data by processing the partial data with a first model based on characteristics of the partial data, a first resolution of the first data being higher than a partial resolution of the partial data, and
    the processor being configured to derive a second data by processing the partial data with a second model based on the characteristic, the second model being different from the first model, a second resolution of the second data being higher than the partial resolution.

Configuration 2
  The data processor according to Configuration 1, wherein
    the partial data is recorded on a magnetic recording medium included in the magnetic recording/reproducing device.

Configuration 3
  The data processor according to Configuration 1 or 2, wherein
    the partial data, the first data, and the second data are related to a RRO (Repeatable Run_Out) of the magnetic recording/reproducing device.

Configuration 4
  The data processor according to Configuration 3, wherein
    the partial data includes (i+k·n)th data, the i is an integer of 1 or more, the k is an integer of 1 or more, the n is an integer of 0 or more, and
    at least one of the first data or the second data includes the (i+n)th data.

Configuration 5
  The data processor according to any one of Configurations 1-4, wherein
    the processor is configured to process the partial data by a third model based on the characteristic to derive a third data,
    the third model is different from the first model and different from the second model, and
    a third resolution of the third data is higher than the partial resolution.

Configuration 6
  The data processor according to any one of Configurations 1-5, wherein
    at least one of the interface section and the processor is included in the magnetic recording/reproducing device.

Configuration 7
  The data processor according to any one of Configurations 1-5, wherein
    a location where at least one of the interface section or the processor is provided is different from a location where the magnetic recording/reproducing device is provided.

Configuration 8
  The data processor according to any one of Configurations 1-7, wherein
    the first model is generated by machine learning based on first learning data related to the control condition,
    the second model is generated by machine learning based on second learning data related to the control condition, and
    at least a part of the second learning data is different from at least a part of the first learning data.

Configuration 9
  A magnetic recording/reproducing device, comprising a data processor,
    the data processor including:
    an interface section configured to acquire partial data relating to a control condition of a magnetic recording/reproducing device; and
    a processor configured to process the partial data,
    the processor being configured to derive a first data by processing the partial data with a first model based on characteristics of the partial data, a first resolution of the first data being higher than a partial resolution of the partial data, and
    the processor being configured to derive a second data by processing the partial data with a second model based on the characteristic, the second model being different from the first model, a second resolution of the second data being higher than the partial resolution.

Configuration 10
  The magnetic recording/reproducing device according to Configuration 9, wherein
    the partial data is recorded on a magnetic recording medium included in the magnetic recording/reproducing device.

Configuration 11
  The magnetic recording/reproducing device according to Configuration 10, further comprising:
    a magnetic head,
    the interface section being configured to acquire the partial data recorded on the magnetic recording medium and reproduced by the magnetic head.

Configuration 12
  The magnetic recording/reproducing device according to Configuration 10, further comprising:
    a magnetic head,
    the magnetic head being configured to record at least one of the first data or the second data on the magnetic recording medium.

Configuration 13
  The magnetic recording/reproducing device according to Configuration 11, wherein
    the magnetic head is configured to record at least one of the first data or the second data in a post code area of the magnetic recording medium.

Configuration 14
  The magnetic recording/reproducing device according to any one of Configurations 11-13, wherein the partial data, the first data, and the second data are related to a RRO (Repeatable Run_Out) of the magnetic recording/reproducing device.

Configuration 15

The magnetic recording/reproducing device according to Configuration 14, wherein the partial data includes (i+k·n)th data, the i is an integer of 1 or more, the k is an integer of 1 or more, the n is an integer of 0 or more, and at least one of the first data or the second data includes the (i+n)th data.

Configuration 16

The magnetic recording/reproducing device according to Configurations 11-15, further comprising:

an operation controller, the operation controller being configured to control at least one of the magnetic recording medium and the magnetic head based on at least one of the first data or the second data.

Configuration 17

The magnetic recording/reproducing device according to Configurations 11-16, wherein the processor is configured to derive a third data by processing the partial data with a third model based on the characteristic, the third model is different from the first model and different from the second model, and a third resolution of the third data is higher than the partial resolution.

Configuration 18

The magnetic recording/reproducing device according to Configurations 9-17, wherein the first model is generated by machine learning based on first learning data related to the control condition, the second model is generated by machine learning based on second learning data related to the control condition, and at least a part of the second learning data is different from at least a part of the first learning data.

Configuration 19

A magnetic recording/reproducing system, comprising:

the data processor according to Configurations 1-8; and the magnetic recording/reproducing device.

Configuration 20

A method for manufacturing a recording/reproducing system device, comprising:

recording at least one of the first data or the second data derived by the data processor according to Configuration 2 on the magnetic recording medium.

According to the embodiments, it is possible to provide a data processor, a magnetic recording/reproducing device, and a magnetic recording/reproducing system that can derive appropriate control conditions.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in data processors, magnetic recording/reproducing devices and magnetic recording/reproducing systems such as controllers, processors, recording sections, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all data processors, magnetic recording/reproducing devices and magnetic recording/reproducing systems practicable by an appropriate design modification by one skilled in the art based on the data processors, magnetic recording/reproducing devices and magnetic recording/reproducing systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A data processor, comprising:

an interface section configured to acquire partial data relating to a control condition of a magnetic recording/reproducing device; and a processor configured to process the partial data, the processor being configured to derive a first data by processing the partial data with a first model based on characteristics of the partial data, a first resolution of the first data being higher than a partial resolution of the partial data, and the processor being configured to derive a second data by processing the partial data with a second model based on the characteristic, the second model being different from the first model, a second resolution of the second data being higher than the partial resolution.

2. The data processor according to claim 1, wherein the partial data is recorded on a magnetic recording medium included in the magnetic recording/reproducing device.

3. The data processor according to claim 1, wherein the partial data, the first data, and the second data are related to a RRO (Repeatable Run_Out) of the magnetic recording/reproducing device.

4. The data processor according to claim 3, wherein the partial data includes (i+k·n)th data, the i is an integer of 1 or more, the k is an integer of 1 or more, the n is an integer of 0 or more, and at least one of the first data or the second data includes the (i+n)th data.

5. The data processor according to claim 1, wherein the processor is configured to process the partial data by a third model based on the characteristic to derive a third data, the third model is different from the first model and different from the second model, and a third resolution of the third data is higher than the partial resolution.

6. The data processor according to claim 1, wherein at least one of the interface section and the processor is included in the magnetic recording/reproducing device.

7. The data processor according to claim 1, wherein
a location where at least one of the interface section or the processor is provided is different from a location where the magnetic recording/reproducing device is provided.

8. The data processor according to claim 1, wherein
the first model is generated by machine learning based on first learning data related to the control condition,
the second model is generated by machine learning based on second learning data related to the control condition, and
at least a part of the second learning data is different from at least a part of the first learning data.

9. A magnetic recording/reproducing system, comprising:
the data processor according to claim 1; and
the magnetic recording/reproducing device.

10. A magnetic recording/reproducing device, comprising a data processor,
the data processor including:
an interface section configured to acquire partial data relating to a control condition of a magnetic recording/reproducing device; and
a processor configured to process the partial data,
the processor being configured to derive a first data by processing the partial data with a first model based on characteristics of the partial data, a first resolution of the first data being higher than a partial resolution of the partial data, and
the processor being configured to derive a second data by processing the partial data with a second model based on the characteristic, the second model being different from the first model, a second resolution of the second data being higher than the partial resolution.

11. The magnetic recording/reproducing device according to claim 10, wherein
the partial data is recorded on a magnetic recording medium included in the magnetic recording/reproducing device.

12. The magnetic recording/reproducing device according to claim 11, further comprising:
a magnetic head,
the interface section being configured to acquire the partial data recorded on the magnetic recording medium and reproduced by the magnetic head.

13. The magnetic recording/reproducing device according to claim 11, further comprising:
a magnetic head,
the magnetic head being configured to record at least one of the first data or the second data on the magnetic recording medium.

14. The magnetic recording/reproducing device according to claim 12, wherein
the magnetic head is configured to record at least one of the first data or the second data in a post code area of the magnetic recording medium.

15. The magnetic recording/reproducing device according to claim 12, wherein
the partial data, the first data, and the second data are related to a RRO (Repeatable Run_Out) of the magnetic recording/reproducing device.

16. The magnetic recording/reproducing device according to claim 15, wherein
the partial data includes (i+k·n)th data, the i is an integer of 1 or more, the k is an integer of 1 or more, the n is an integer of 0 or more, and
at least one of the first data or the second data includes the (i+n)th data.

17. The magnetic recording/reproducing device according to claim 12, further comprising:
an operation controller,
the operation controller being configured to control at least one of the magnetic recording medium and the magnetic head based on at least one of the first data or the second data.

18. The magnetic recording/reproducing device according to claim 12, wherein
the processor is configured to derive a third data by processing the partial data with a third model based on the characteristic,
the third model is different from the first model and different from the second model, and
a third resolution of the third data is higher than the partial resolution.

19. The magnetic recording/reproducing device according to claim 10, wherein
the first model is generated by machine learning based on first learning data related to the control condition,
the second model is generated by machine learning based on second learning data related to the control condition, and
at least a part of the second learning data is different from at least a part of the first learning data.

* * * * *